United States Patent [19]
Butler et al.

[11] Patent Number: 5,903,345
[45] Date of Patent: May 11, 1999

[54] REMOTELY POSITIONABLE GRAVITY ORIENTED LASER SCANNER

[75] Inventors: Andrew G. Butler, Palo Alto; Eugene F. Duval; Daniel T. Adams, both of Menlo Park, all of Calif.

[73] Assignees: DWBH Ventures Ltd., Sasson House; c/o Ernst & Young, Nassau, both of Bahamas

[21] Appl. No.: 08/878,782

[22] Filed: Jun. 19, 1997

Related U.S. Application Data

[63] Continuation-in-part of application No. 08/609,552, Mar. 1, 1996, Pat. No. 5,680,208.

[51] Int. Cl.$^6$ .............................. G01C 9/02; F16M 11/00
[52] U.S. Cl. ........................................ 356/247; 248/176.1
[58] Field of Search ..................................... 356/248, 138, 356/142, 148, 149, 150, 152, 153; 340/825.71, 825.72; 248/176.1, 177.1, 178.1, 187.1

[56] References Cited

U.S. PATENT DOCUMENTS

| | | |
|---|---|---|
| 3,859,736 | 1/1975 | Hill et al. . |
| 4,828,376 | 5/1989 | Padera . |
| 4,854,703 | 8/1989 | Ammann .................................. 356/248 |
| 4,907,879 | 3/1990 | Webb . |
| 5,073,824 | 12/1991 | Vertin ....................................... 358/210 |
| 5,075,977 | 12/1991 | Rando . |
| 5,182,863 | 2/1993 | Rando . |
| 5,287,627 | 2/1994 | Rando . |
| 5,309,212 | 5/1994 | Clark ........................................... 356/5 |
| 5,537,205 | 7/1996 | Costa et al. . |
| 5,541,727 | 7/1996 | Rando et al. . |
| 5,735,497 | 4/1998 | Hass et al. ............................ 248/181.1 |

OTHER PUBLICATIONS

Delta Airlines Mail Catalogue, Jan. 1996, pp. 20,22.

Levelite Technology, Inc. brochures, Jan. 1996, 10 pages.

*Primary Examiner*—Robert H. Kim
*Assistant Examiner*—Michael P. Stafira
*Attorney, Agent, or Firm*—Fliesler, Dubb, Meyer & Lovejoy LLP

[57] ABSTRACT

A remotely controlled adjustable height support stand 200 for positioning the laser scanner 50 vertically as well as a remote control for adjusting the height and/or angular position of the laser scanner 50 is disclosed.

27 Claims, 8 Drawing Sheets

FIG.−1

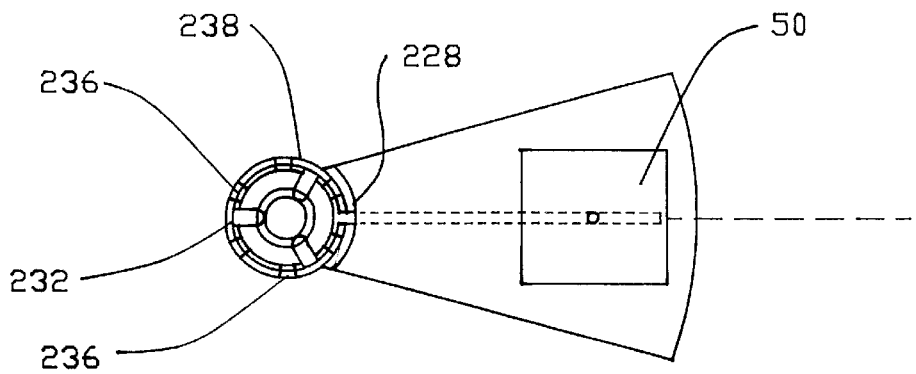
FIG.−6
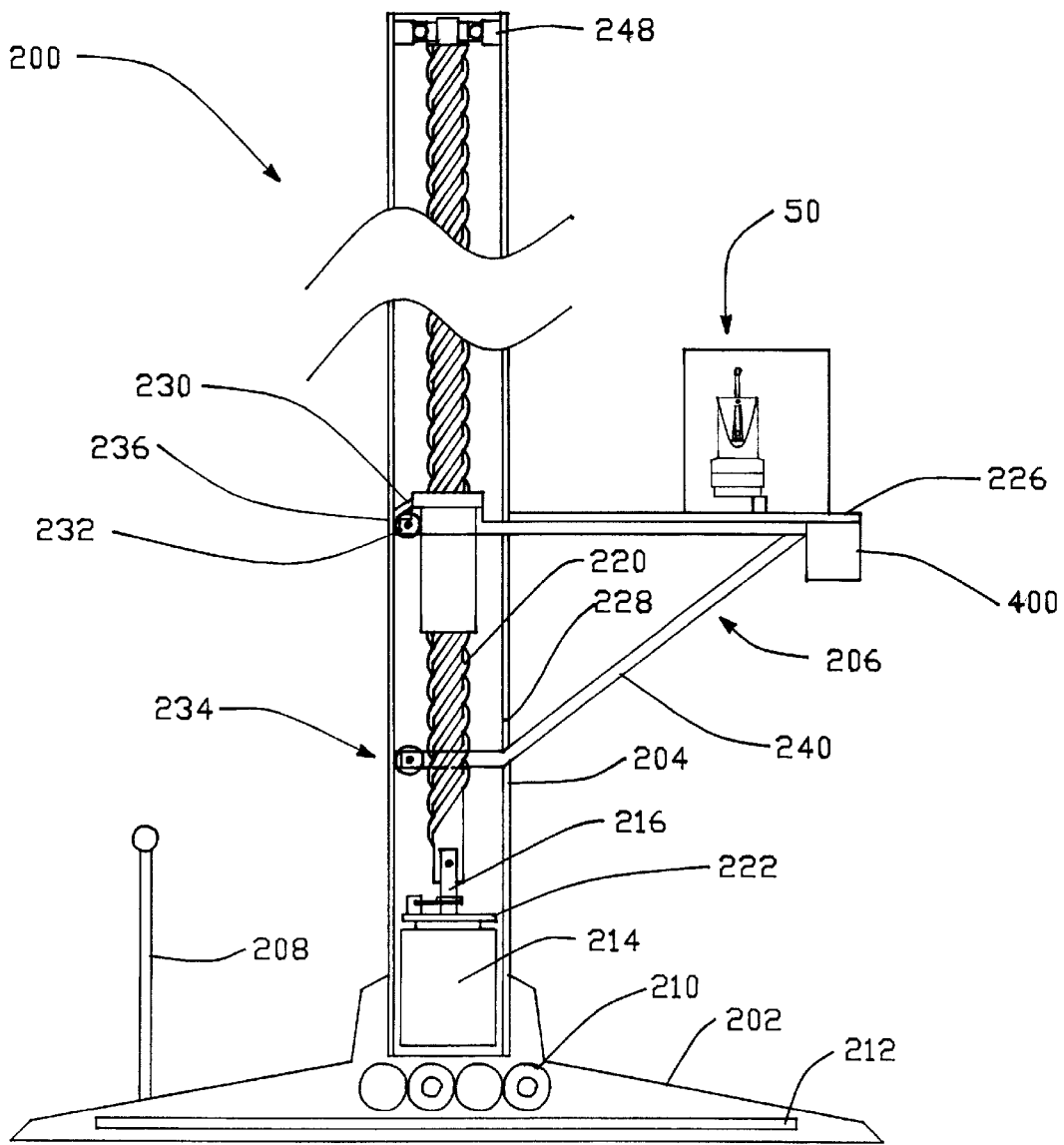
FIG.−5

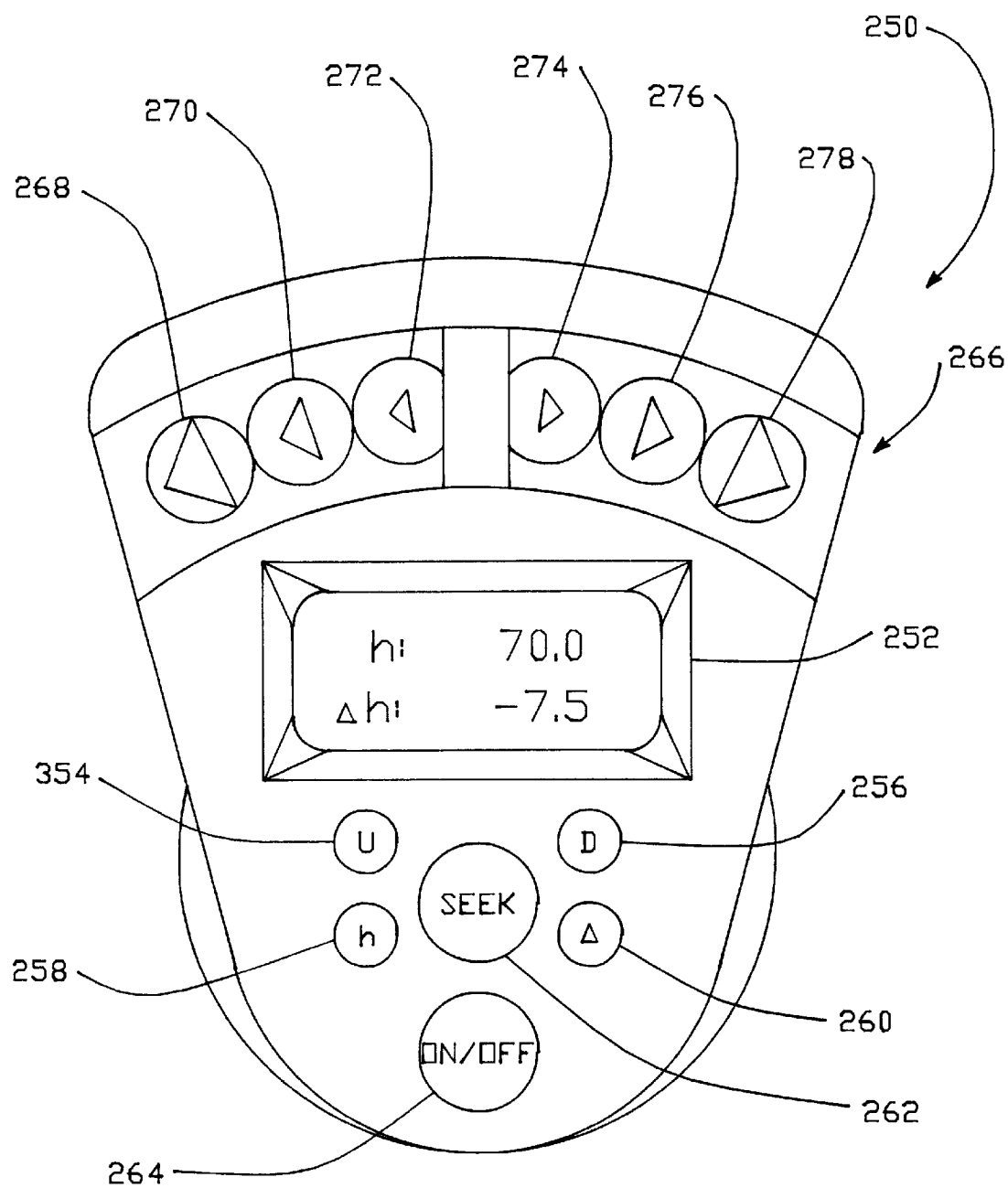
FIG.−7

REMOTELY POSITIONABLE GRAVITY ORIENTED LASER SCANNER

CROSS-REFERENCE

This application is a continuation-in-part of Ser. No. 609,552, now U.S. Pat. No. 5,680,208, filed on Mar. 1, 1996, entitled GRAVITY ORIENTED LASER SCANNER, listing Andrew G. Butler, Eugene F. Duval, Gregory L. Richards, Mitchell C. Barham, Daniel T. Adams, William A. Scott, and David C. Shafer, all as inventors, and having Attorney Docket No. DWBH 1002 SRM.

FIELD OF THE INVENTION

The present invention is directed to a mechanism using a laser beam to determine at least one of vertical and horizontal orientation.

BACKGROUND OF THE INVENTION

Prior art exists in the field of measuring a horizontal plane relative to gravity. Standard transits, theodelites, and builder's levels are tripod mounted optical devices. To be accurate, such devices require an extremely precise leveling of the unit relative to the tripod. The bubble levels and electronic sensors used in the instrument mounts are elaborate, expensive, and very time consuming to use each time the unit is moved to a new location.

SUMMARY OF THE INVENTION

Accordingly a laser scanner is provided that directs a laser beam in at least one of a horizontal and a vertical direction and overcomes the disadvantages of the prior art. The laser scanner can rotate the direction of the beam through a full 360° in a horizontal plane. The horizontal laser beam can be used for surveying or for alignment.

A laser scanner of one embodiment of the invention includes a pendulum hung laser which can identify desired elevations.

In another aspect of the invention, the laser scanner is remotely controlled.

In yet a further aspect of the invention, a remotely controlled adjustable height support stand is provided for the laser scanner of the invention.

In yet a further aspect of the invention, a remote control for remote angle positioning of the laser scanner is presented.

It is a further object of the invention to provide a low cost pendulum style, remote controlled, laser positioning system.

It is a yet another object to provide an auto-leveling pendulum laser system for carpenters, plumbers and craftsmen and tradesmen in order to determine elevation.

Other inventive aspects and objects are set out below.

BRIEF DESCRIPTION OF THE FIGURES

FIG. 5 is a partially sectioned elevational view of an embodiment of the remotely controlled adjustable height support stand for the laser scanner.

FIG. 6 is a top view of the embodiment in FIG. 5.

FIG. 7 is an elevational view of a hand-held remote control for the adjustable height support stand of the embodiment of FIG. 5.

DETAILED DESCRIPTION OF THE PREFERRED EMBODIMENT

Figure 1:
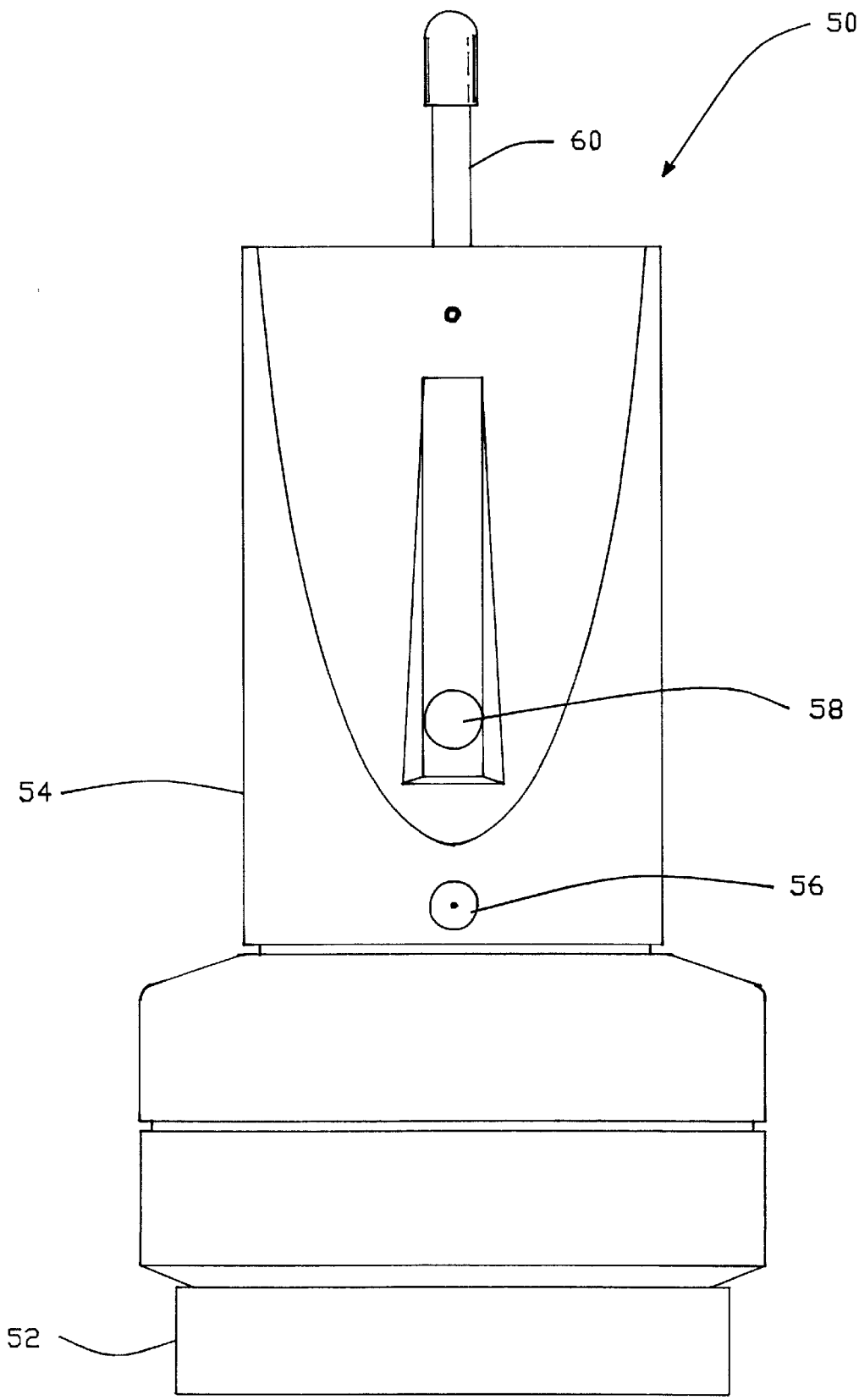
FIG. 1 is a front elevational view of an embodiment of the invention which is meant to be mounted by its base.
Figure 2:
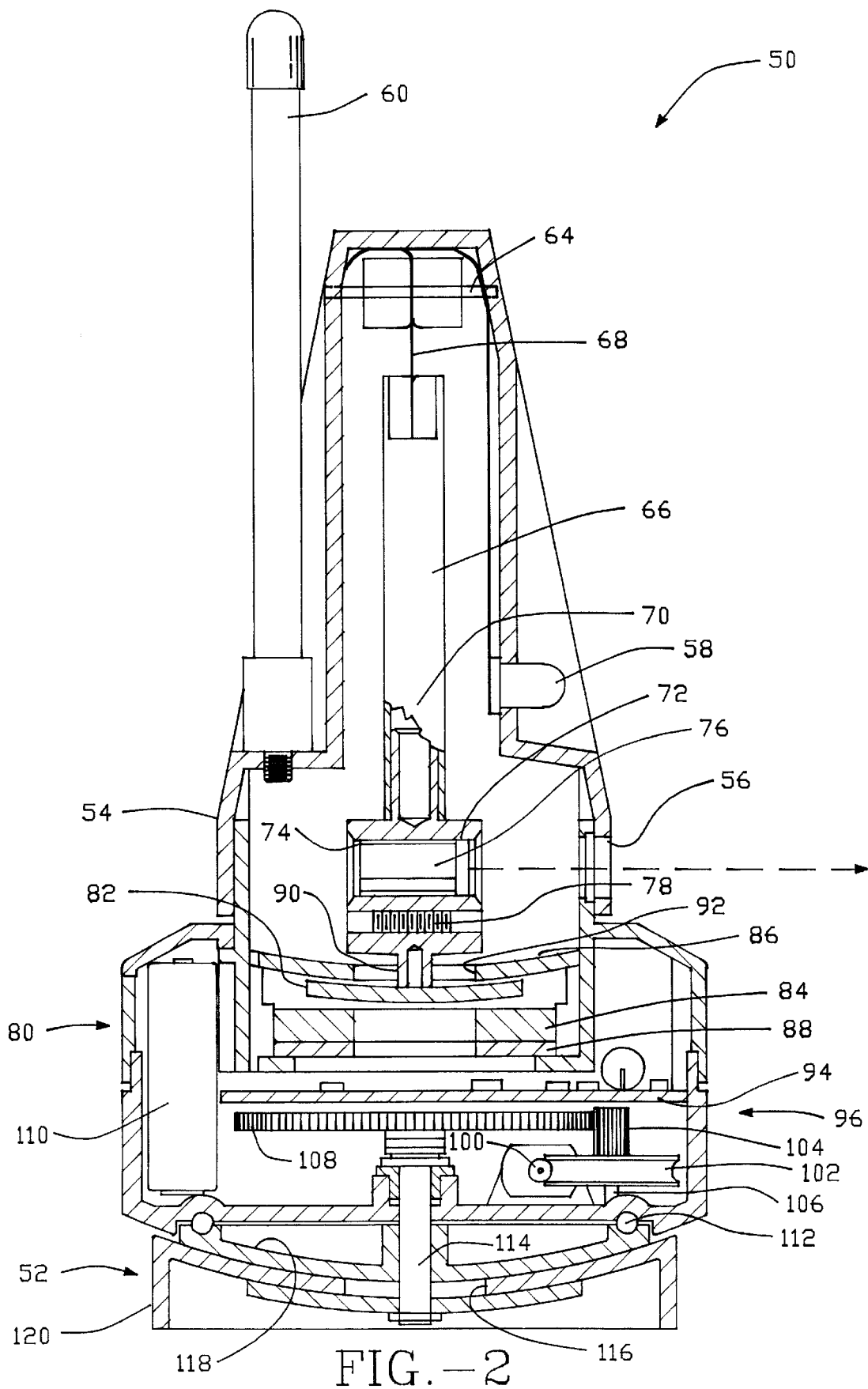
FIG. 2 is a cross-sectional view of the embodiment of FIG. 1 rotated by 90°.
Figure 3:
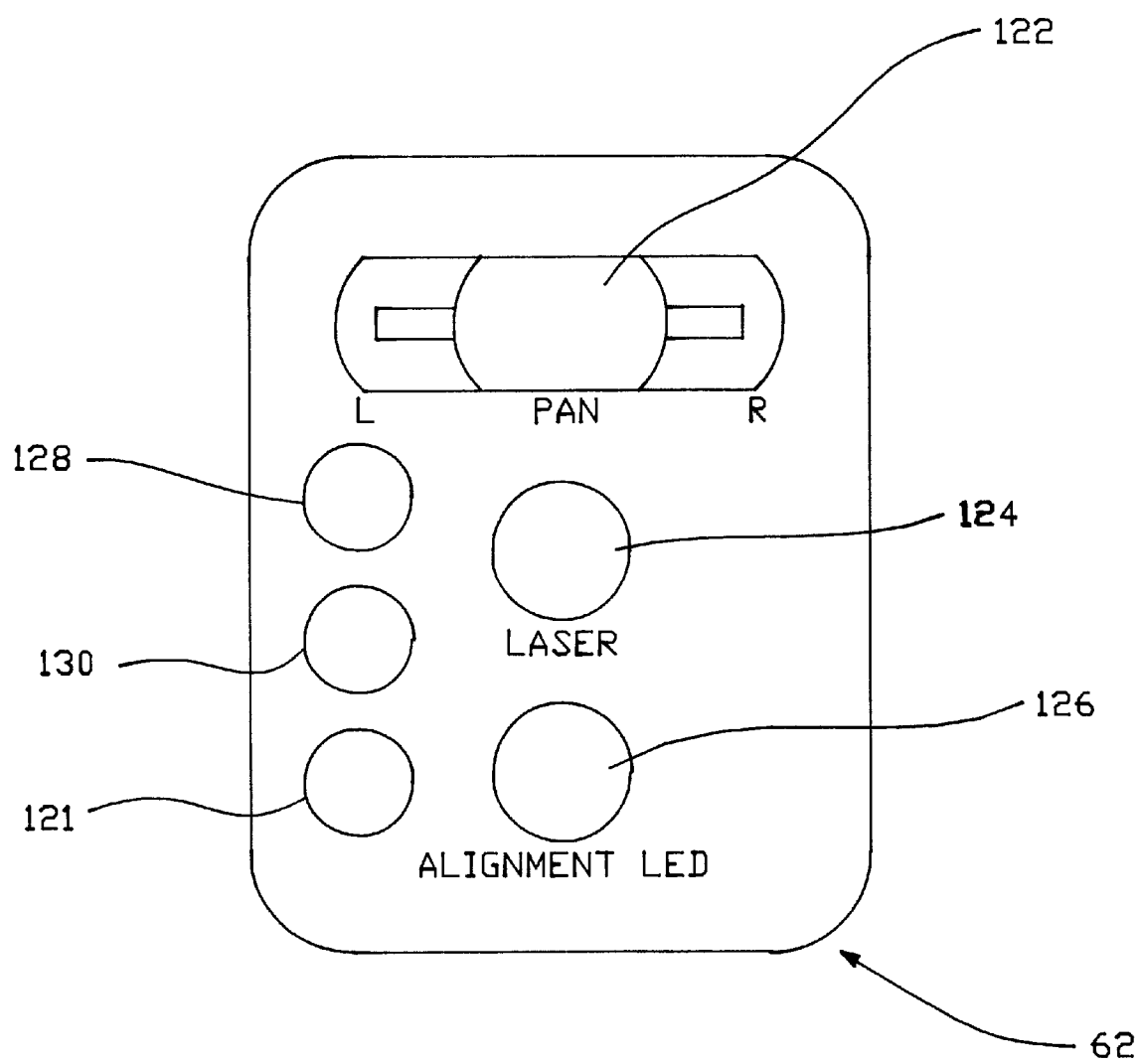
FIG. 3 is a elevational view of a handheld remote control for the embodiment of FIG. 1.

An embodiment of the laser scanner 50 of the invention is depicted in FIGS. 1–4. In FIG. 1, the laser scanner 50 includes a base 52 on which is mounted a rotatable housing 54. Base 52 is intended to be mounted on, for example, a stable surface such as a desk top or the top of a tripod. In FIG. 1 it can be seen that the laser scanner 50 further includes a port 56 out of which a laser beam can be projected and a broad light source 58 which can include, for example, an LED for purposes of easily determining the position of the laser light coming from port 56 as will be discussed hereinbelow. Also included in FIG. 1 is an antenna 60 which can be used to signal the laser scanner 50 using a remote control 62 (FIG. 3).

Turning to FIG. 2, the laser scanner 50 includes a pivot pin 64 from which a pendulum 66 is hung. The pivot pin 60 allows the pendulum 66 to rotate in and out of the page. The pendulum 66 is hung by a flexure 68 allowing the pendulum 66 to pivot from side to side in the plain of the page. The flexure 68 in a preferred embodiment is comprised of a polyimide which is sold under the tradename Kapton. Mylar® can also be used. It is to be understood that other plastics and metal materials can be used as the flexure.

The pendulum 66 includes an elongated body 70 with a transverse laser mount 72 located at its distal end. The transverse laser mount 72 includes a transverse bore 74 which can receive a laser light source. In a preferred embodiment, the laser source 76 includes a laser diode with appropriate optics. In this preferred embodiment, the laser is capable of generating a red light with a wave length of 650 nanometers. The light is projected through the port 56.

Underneath the laser 76 is an adjustment screw 78 which can be positioned and repositioned in order to adjust the center of gravity of the pendulum 66 relative to the pivot pin 64.

Also located beneath the laser 76 is a damper arrangement 80. The damper arrangement 80 includes a copper disk 82 which is secured to the base of the pendulum 66. The damper arrangement 80 also includes a magnet 84 which is secured to housing 54. Magnet 84 can be a permanent magnet or an electromagnet. As the pendulum 66 swings relative to the pivot pin 64, the copper disk 82 swings with two degrees of freedom relative to the magnet 84. The swinging motion generates eddy currents in the copper disk 82, damping the swinging of the pendulum 66. It is to be understood that other compositions and materials can be used to generate eddy currents and thus a damping effect between the pendulum 66 and the housing 54 of the laser scanner 50. As can be seen in FIG. 2, the damper mechanism 80 is encased between the steel plates 86 and 88. The copper disk 82 is hung from the pendulum 66 by an extension 90 which extends through an aperture 92. In this embodiment, the aperture preferably allows a plus or minus 3° swing of the pendulum 66.

Located below the damping arrangement 80 is a circuit board 94 which will be discussed in greater detail with respect to FIG. 4. Below the circuit board 94 is the motor and gear arrangement 96. The motor and gear arrangement 96 includes a motor 98 which is preferably a DC motor. Stepper motors and other types of motors can also be used in this arrangement. Also enclosed in the rotatable housing 54 is the battery 110.

The motor and gear arrangement 96 further includes a first gear 100 which is mounted to the shaft of motor 98. The second and third gears 102, 104 are mounted on a rotatable shaft 106. Gear 104 meshes with fourth gear 108. Fourth gear 108 is fixed and does not move relative to base 52. Thus, as the motor 98 is operated, the motor, as the second and third gears 102, 104, as well as the entire rotatable housing 54, rotates above the base 52 and about the fourth gear 108.

The rotatable housing 54 is mounted to the base 52 by a set of ball bearings 112. As can be seen in FIG. 3, the fixed shaft 114 upon which the fixed fourth gear 108 is mounted projects through a aperture 116 of the base 52. The aperture 116 allows a plus or minus 5° of movement of the shaft 114. Thus in combination with the movement allowed by aperture 92, the pendulum 66 can be aligned approximately plus or minus eight degrees in any direction relative to the housing bore 52. The lower portion 118 of the base 52 which is substantial spherical can be moved relative to the fixed portion 120 of the base 52, up to the limits of the movement of the shaft 114 in the aperture 116.

The broad light source 58, the laser 76, and the antenna 60 are all electrically communicated with the circuit board 94 by traces as shown in the figure. The broad light source 58 is readily observable and helps the user to determine the orientation of the laser 76 and the light emitted therefrom.

FIG. 3 depicts a handheld remote control 62. In a preferred embodiment, remote control uses radio frequency signals in order to control the position and movement of the laser scanner 50.

It should be understood that the remote control need not be limited to radio frequency technology. Any suitable electromagnetic frequency could be used (radio, microwave, very low frequency, IR, visible light, etc.). Acoustic transmission including ultrasonic frequencies could be used. It would even be possible to use a voice command system that would not require any remote control.

The remote control 62 includes in this preferred embodiment a pan button 122 which causes the motor to drive the rotatable housing 54 in a clockwise or counterclockwise direction. The remote control 62 further includes a laser diode on/off switch 124 and a broad light source 126. Also included on the control is a memory button 128 which stores in the memory of the laser scanner 50 a desired position, and a return button 130 which causes the rotatable housing 54 to return to a stored location.

The angular velocity of housing 54 could be adjusted from slow to fast by pushing the pan button 122 more in the clockwise or counterclockwise direction. A very slow rate would make it much easier to point the laser in a desired direction. A fast rate would save time when making large angle changes. For units that continuously sweep the laser, a continuous sweep button 121 is used. The angular velocity can also be remotely adjusted using the pan button 122 in conjunction with the sweep button 121.

Figure 4:
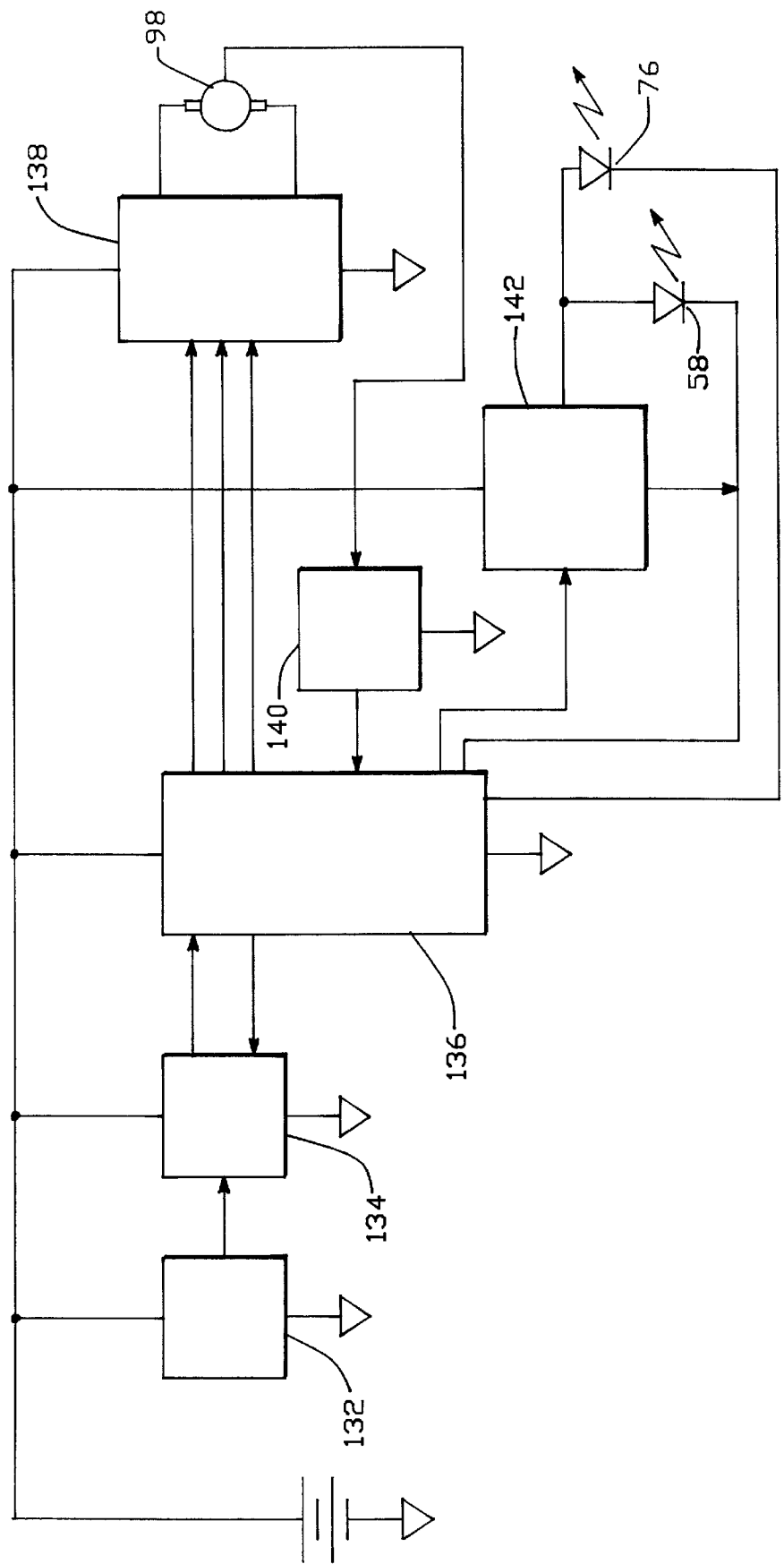
FIG. 4 is a schematical representation of the circuitry for the embodiment of FIG. 1.

FIG. 4 depicts a representative schematic for the circuit provided on circuit board 94 of the embodiment of FIG. 3. The circuit as shown in FIG. 4 includes the above-mentioned battery 110 which is connected to a RF receiver 132. The signal from the RF receiver 132 is decoded in decoder 134, with decoder 134 providing data and commands to microprocessor 136. Microprocessor 136 provides a signal to in this preferred embodiment an H bridge 138. H bridge 138 allows use of a single battery to drive the DC motor 98 in either a forward or reverse direction. In this preferred embodiment, pulse width modulation signals are sent from the microprocessor 136 to the H bridge 138 in order to drive the motor 98. Further, a direction signal is sent from the microprocessor to the H bridge 138 in order to select the direction that the motor 98 will be driven. Finally, a brake signal is set for the microprocessor 136 to the H bridge 138 in order to stop the movement of the motor 98. The motor 98 includes an encoder which sends a signal to the encoder counter 140 for purposes of determining the position of the motor 98. Encoder counter 140 communicates with the microprocessor 136 for storing the location of the laser 76, as desired. Finally, the circuit of FIG. 5 depicts the voltage regulator 142 which applies an appropriate voltage to the broad light source 58 and the laser 76.

The remote control feature of the present embodiment affords a number of advantages to this invention. First, the laser scanner 50 can be remotely turned on and off without having to walk to the scanner 50, thus extending the life of the battery mounted in the laser scanner 50. Another user does not have to walk back to the laser scanner in order to reposition it to a desired position.

As the laser scanner can be rotated as desired or held in a fixed position as desired, a weaker laser source can be used and still be identified by the user. Were the laser source continually scanning, a stronger laser source would have to be used in order for the laser beam to be identifiable by the user. Further, as the laser source can be stopped in a desired position, and the laser can be allowed to come to a settled position before a measurement is made and thus there is no need to design in this embodiment expensive anti-vibrational mechanisms which prevent the laser scanner from vibrating. Such vibrations could make a difference in the position of the laser light when it strikes its target. As the laser scanner 50 can come to a full stop position with the laser light on, the pendulum 66 can settle before the laser beam is used to determine a horizontal or vertical position.

A remotely controlled adjustable height stand 200 for use with the laser scanner 50 is shown in FIG. 5. It is to be understood that scanners other than scanner 50 can be used successfully with the remote control adjustable height stand 200. By way of example only, alternative scanners can include a device that continually project a laser beam for a full 360° or for a portion of said 360°. The stand 200 includes a disk shared base 202 which is preferably weighted. Base 202 could also be comprised of a tripod or other arrangement for supporting upstanding column 204. Supported from the column 204 is a carriage 206 upon which the laser scanner 50 can be mounted.

The base 202 also includes remote control antenna 208 upstanding therefrom. Housed in the base 202 is a power supply which can include for example batteries 210 although an A/C power supply could also be used. Additionally in the base is a printed circuit board 212 which can receive and interpret signals from the antenna 208 and control the motor 214 which can be a stepper or DC motor or other actuation mechanism. It is to be understood that the antenna 208 and the printed circuit board 210 can be used for receiving and/or sending information from and to the hand-held controller which will be described hereinbelow. As can be seen in FIG. 5, the motor is held in the base 202 and housed by the upstanding column 204. In the upstanding column between a shaft 216 of the motor and bearings 218, which is contained in the uppermost part of upstanding column 204, is a threaded shaft or lead screw 220. As the shaft 216 of the motor turns, the threaded shaft or lead screw 220 is also caused to turn in order to adjust the position of the carriage 206 as described hereinbelow. About the shaft 216 of the motor 214 is a rotary encoder or related circuitry 222. This encoder 222 communicates with the printed circuit board 212 in order to report to the printed circuit board 212 the position of the threaded shaft 220.

The carriage 206 has a platform 226 upon which the laser scanner 50 is mounted. The platform 226 is secured through a slot 228, which runs vertically for the length of the upstanding column 204, to a lead nut 230. The lead nut 230 is mounted about the threaded shaft 220. As the shaft is caused to rotate by the motor 214, the lead nut, and thus the carriage move up and down relative to the upstanding column 204. It can be appreciated that other mechanisms using, by way of example only, hydraulics, belts, pulleys, gears, telescoping columns, and the like, can be used to adjust the height of the carriage relative to the stand 200 as a whole.

The motion of the carriage 206 is guided by first and second sets of guide rollers 232 and 234. The first set of guide rollers 232 include three individual rollers 236. Each of these rollers travel in guide channels 238 (FIG. 6) which are positioned on the inside of the upstanding column 204. This first and second set of rollers 232, 234 ensure that the lead nut 230 is centrally positioned within the upstanding column 204 and thus that the laser scanner 50 can be moved smoothly in a vertical direction.

The carriage 206 includes a supporting arm 240 which is secured through slot 228 to a frame 242. The frame 242 is connected to the lead nut 230, and it is to the frame that the second set of rollers 234 is mounted. The second set of rollers 234 also moves in the channel 238. Accordingly with an appropriate signal received by the antenna 208, the position of the laser scanner 50 can be adjusted upwardly or downwardly along the upstanding column 204.

Through the use of appropriate remote control device as described hereinbelow, the height of the laser scanner 50 can be adjusted to, for example, allow a brick layer to lay successively higher rows of bricks. For each vertical position, the position of the laser can be adjusted through 360° in order to transfer the exact elevation from one point to another. It can be seen by using the apparatus of FIG. 5 that both a vertical line and a horizontal line can be drawn using laser scanner 50. Further, alternating vertical and horizontal lines can be drawn in order to provide a step function. Thus, it is evident that the present device allows for any position to be transported or moved both horizontally and/or vertically. Accordingly, when the first position is identified, the laser scanner can be caused to be moved to that position. If it is then desired that the position be transported horizontally, the laser scanner 50 can be panned until the horizontal position has been identified. If the initial position is to be moved to a new elevation, the motor 214 can be actuated in order to cause the carriage 206 to move vertically.

Figure 8:
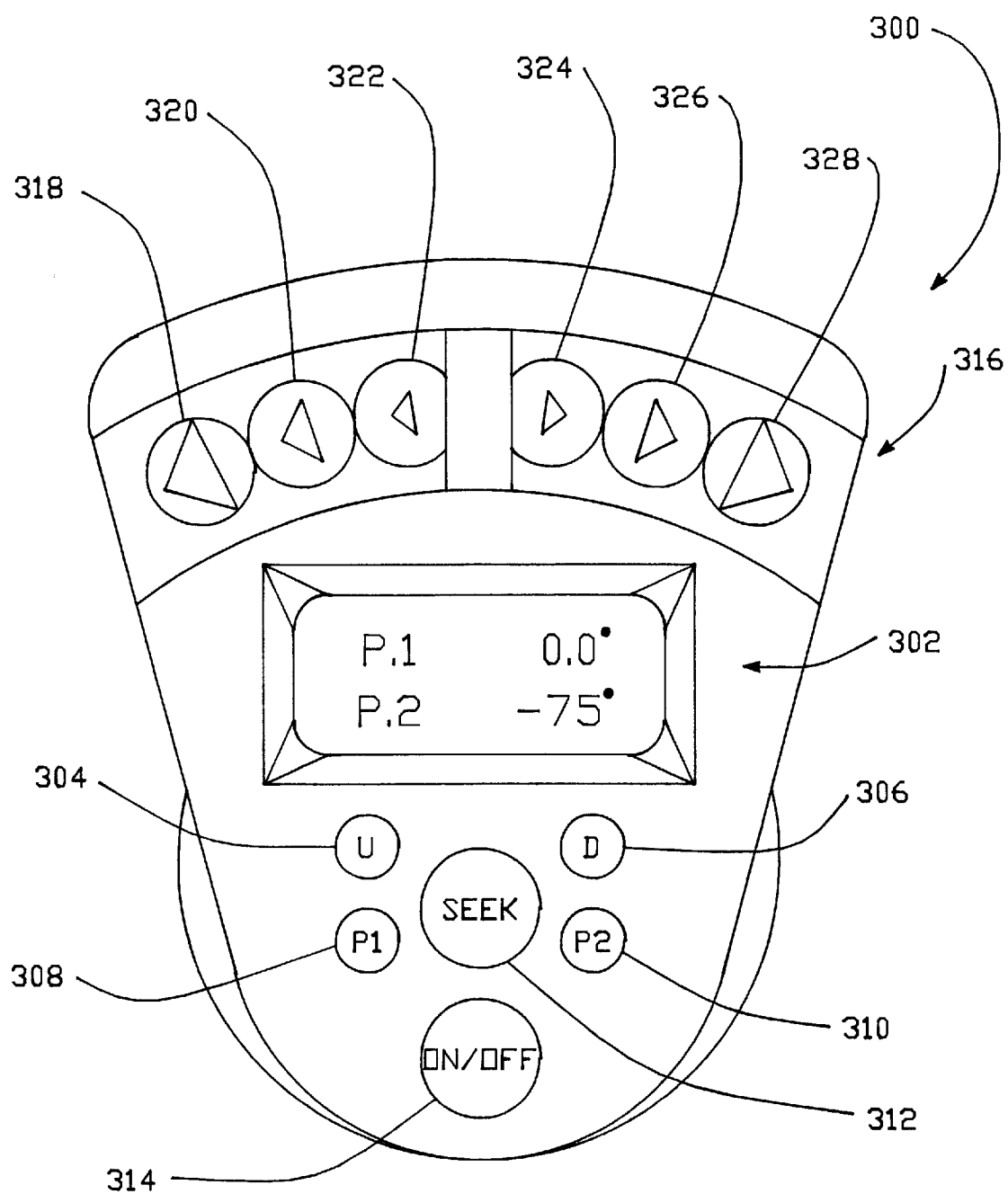
FIG. 8 is an elevational view of a hand-held remote control for angular positioning.
Figure 9:
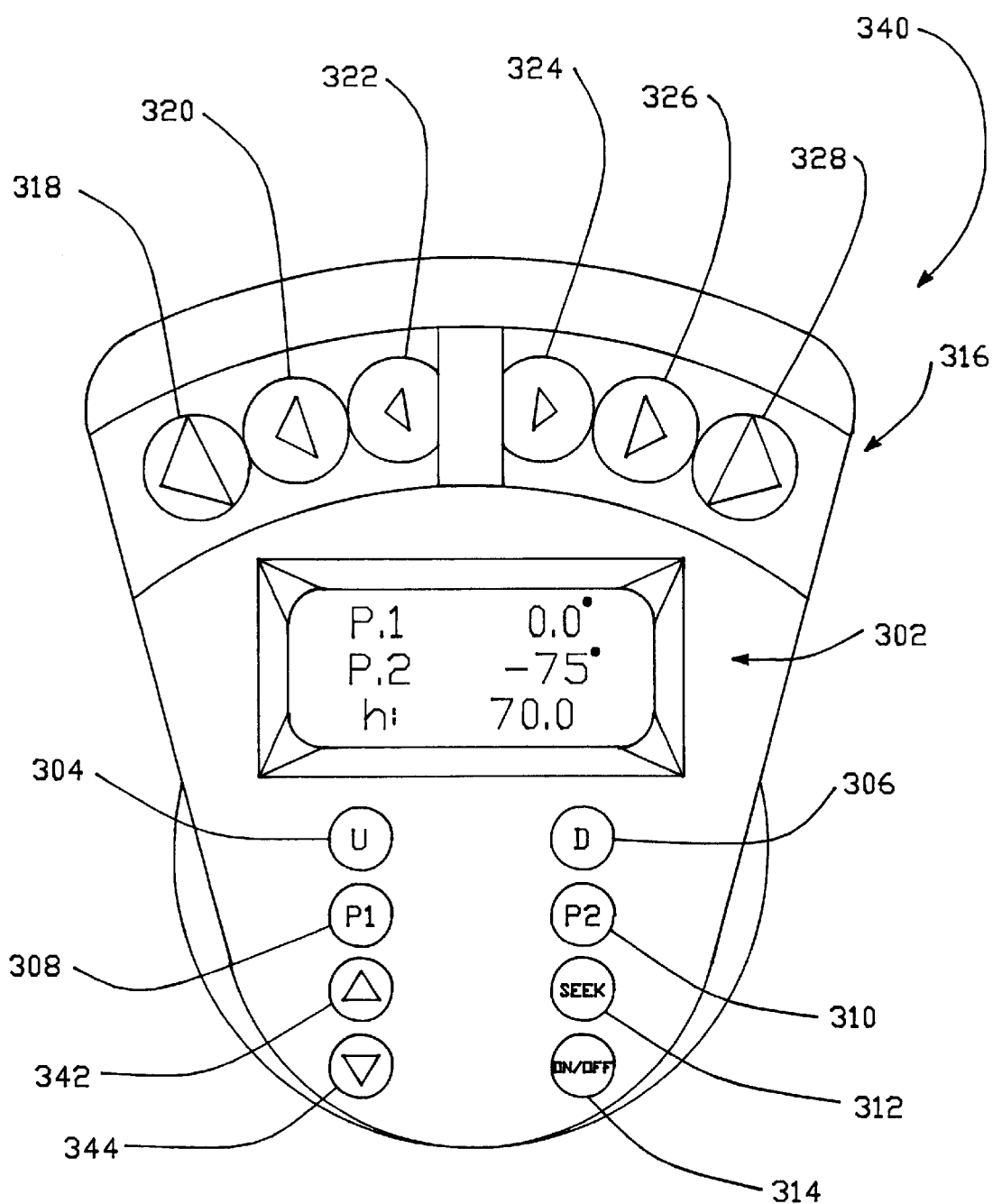
FIG. 9 is a remote control which combines several of the features of remote controls found in FIGS. 7 and 8.

In addition to the above FIG. 3, the below FIGS. 7, 8 and 9 show remote controllers for use with the laser scanner 50 and/or the stand 200.

In FIG. 7 a remote control 250 for controlling the height of the carriage 206 and thus the laser scanner 50 is depicted. Although the remote controller shown in FIG. 7 is hand held, all the described functionality therefrom can be placed in a non-hand held remote control and be within the spirit and scope of the invention. The remote control 250 includes LED display 252. The LED display 252 shows the current height of the laser dot emanating from the laser scanner 50 as well as a desired change in that height. The LED display 252 can be set by using control buttons 254, 256, 258 and 260. Button 258 selects the height display h with buttons 254 and 256 causing the height number displayed to increment upwardly or downwardly for a desired reading that corresponds with the current height of the laser beam. Button 260 selects the change in height display Δh with buttons 254 and 256 causing the change in height value to be adjusted upwardly or downwardly. Button 262 is a seek button which causes the height of the laser scanner 50 to be adjusted in accordance with the incremental height change. As the height is being adjusted, the height reading on the LED 252 is accordingly changed in order to reflect the new height. Button 264 controls the laser emanating from the laser scanner 50 by turning the laser beam on and off.

A scan array 266 is positioned at the top of the remote controller 250. The scan array includes buttons 268 through 278. These buttons 268 through 278 control the appropriate scanning mechanisms of laser scanner 50 shown in FIG. 2. Buttons 268, 270 and 272 cause the laser scanner 50 to scan in a counter-clockwise direction while buttons 274, 276 and 278 cause the laser scanner 50 to scan in a clock-wise direction. Buttons 268 and 278 cause the scanning to occur at the most rapid rate while buttons 272 and 274 cause scanning to occur at a lower rate.

FIG. 8 depicts an alternative remote controller 300 for scanner 50. The remote controller 300 includes an LED display 302 where P1 designates the current angular position (as set with buttons 304, 306, and 308 described below) of the laser beam of the laser scanner 50 and P2 designates the amount of incremental change of the angular position that is desired. Controller 300 includes buttons 304 through 310. Button 308 selects and controls display P1 and button 310 selects and controls display P2. Button 304 causes the value display for either P1 or P2 (as selected by buttons 308 and 310) to move up while button 306 causes the value display for either P1 or P2 (as selected by buttons 308 and 310) to move down. Button 312 causes the laser scanner 50 to pan through the change in angular position as designated by display P2. As this occurs, the angular position P1 changes. Button 314 causes the laser scanner 350 to be turned on and off.

As with the controller in FIG. 7, the controller 300 in FIG. 8 includes a scanning array 316 which is made up of buttons 318 through 328. Buttons 318 through 322 cause the laser scanner 50 to scan counter-clockwise. Buttons 324 through 328 cause the laser scanner 50 to scan clockwise. Buttons 318 and 328 cause a more rapid scan than buttons 322 and 326. Additionally, a combination of pushing one of the buttons in the scanner array 316 in combination with the seek button 312 causes the scanning to occur at the appropriate rate with respect to the button pushed in the scanning array 316.

It is to be understood that with respect to FIGS. 7 and 8 that even though the display shows the current height or angular position and the desired incremental change, that the display could in addition or substitution also show and be capable of programming a desired height and/or a desired angular position with that height and position gained through the actuation of the seek button after the desired position or height had been selected and displayed on the display.

Further variations of the remote control are shown in FIG. 9. This remote control 340 is similar to the remote control 300 in FIG. 8 and thus similar numbers are assigned. Remote controller 340 includes a display 302 which displays the actual height h of the laser scanner 50. The height h of the stand 200 can be adjusted using the up and down buttons 342 and 344. By pushing button 342, the laser scanner is urged upwardly with a corresponding higher reading for the h value in the LED 302. Pushing button 344 causes a reduced h value reading in LED display 302, and a corresponding lowering of the laser scanner 50 of FIG. 5.

As part of the circuitry in either or both of the remote control and the stand, memory devices can be used to store desired heights, angular positions, or combination, sequences, and series of the same as desired for various applications. Further as part of the circuitry of either or both of the remote control and stand, data can be sent back and forth between the remote control and the stand and stored where received for feedback control, updating and other purposes. Data can also be sent between the remote control and/or the stand and a third source.

With respect to FIG. 5, the stand 200 can incorporate a range finding apparatus such as for example range finding apparatus 400 mounted under platform 226. Range finding apparatus 400 communicates with circuit board 212 so that information can be shared between range finding apparatus 400 and any of the remote controls such as the remote controls shown in FIGS. 7, 8, and 9. Range finding apparatus 400 can be used to, for example, determine a slope between several positions. Preferably, the first location would be determined using the range finding apparatus 400 and the laser scanner 50. After a desired inclination is determined, calculations could be made in the remote control or in the circuit board 212 in order to calculate a new height at a new location in order to establish the desired inclination between the initial elevation and location and the desired elevation and location. This would be accomplished, by way of example only, by finding the range using the range finding apparatus 400 to the new location. With this range, and knowing the desired inclination, a calculation could be made in order to determine a new elevation that the laser scanner 50 should be adjusted for. Once this calculation is made, the platform 226 could be raised or lowered in order to move the laser scanner to the desired elevation. Once this has occurred, the laser scanner can identify the desired elevation at the new location in order to establish the inclination to the desired location from the initial location.

In order to accomplish this functionality, the remote control in FIG. 9 can, for example, be additionally programmed so that by pushing the up and down buttons 342 and 344 simultaneously, the range finder 400 would automatically be actuated in order to measure a distance to a desired location. Once this has occurred, the distance would be shown on display 302. Then the desired inclination would be introduced using button 308 to initiate entry of desired inclination and buttons 304 and 306 would be used to select the actual desired inclination. Once this has occurred, again pushing button 308, the stand could move the scanner 50 to the desired elevation. With that elevation, the light projected from the scanner would intersect the desired location at the desired elevation, establishing the inclination from the initial elevation at the initial location to the desired elevation at the desired location. In order to go back into the original mode, buttons 342 and 344 would be again pressed simultaneously. It is to be understood that dedicated buttons could be designed into the control of FIG. 9 in order to control the range finding apparatus 400 and the various calculations required in order to determine inclination.

INDUSTRIAL APPLICABILITY

As can be seen from the above, the laser scanner of the invention provides for an economical scanner which is easy to operate in an accurate manner using a remote control. Embodiments provided a smooth operation without vibrations and without expensive anti-vibration elements. Further, the present invention allows for the height and the angular position of the laser beam projected from the laser scanner 50 to be conveniently and easily adjusted so that positions can be moved both horizontally and vertically and a combination of both horizontally and vertically in order to accomplished desired results.

Other aspects, embodiments, and objects for the invention can be observed from a review of the figures and the attached claims. It is to be understood that other embodiments can be developed and be within the spirit and scope of the invention as claimed.

We claim:

1. A remote controlled adjustable height positioner for a laser projection system comprising:

a base;

a column upstanding from said base;

a carriage movably mounted to said column;

said carriage adapted to have mounted thereon a laser position determining system;

a movement device that can move the carriage along said column relative to said base; and a controller that is adapted to be responsive to a remote control signal in order to cause the movement device to move the carriage so that the laser projection system can be moved.

2. The positioner of claim 1 including:

a remote control that can issue a remote control signal that is received by the controller in order to cause the carriage to move relative to the base.

3. The positioner of claim 1 wherein:

said movement device can move the carriage relative to said base;

a lead screw is positioned inside of said upstanding column;

said movement device is operably connected to said lead screw;

said carriage is operably connected to said lead screw; and said movement device can cause said lead screw to rotate in order to position said carriage relative to said upstanding column responsive to a signal from said controller.

4. The positioner of claim 1 including:

a remote control that can issue a first remote control signal that is received by the controller in order to cause the carriage to move relative to the base and a second remote control signal that can cause a laser projection system to cause a laser beam to rotate.

5. The positioner of claim 1 including:

a hand held remote controller that can issue (i) a first remote control signal that is received by the controller in order to cause the carriage and the laser projection system to move vertically, and (ii) a second remote control signal that can cause a laser projection system to cause a laser beam to rotate about a vertical axis.

6. The positioner of claim 5 wherein:

said remote control can issue said first and second remote control signals either (i) simultaneously or (ii) alternately.

7. The positioner of claim 1 including:

a memory mechanism that can store instructions for the movement of the carriage.

8. The positioner of claim 4 including:

a memory mechanism in said remote control that can store instructions for the movement of the carriage and the laser position determining system.

9. A laser projection system comprising:

a base;

a light source;

a platform upon which said light source is mounted;

said platform mounted to said base;

a first mechanism that can cause the light source to rotate relative to said platform;

a second mechanism that can cause the platform to move both toward and away from said base;

a first controller that can actuate said first mechanisms;

a second controller that can actuate said second mechanism; and a remote control that can send signals to said first and second controller in order to cause at least one of said light source to rotate with respect to said platform and said platform to move.

10. The system of claim 9 wherein:

said second mechanism can cause the platform to move along a vertical path; and said first mechanism can cause the light source to rotate about the vertical paths.

11. The system of claim 9 wherein:

said remote control can cause said first and said second mechanisms to operate simultaneously and at different times.

12. The system of claim 9 wherein:

said remote control can cause the light source to seek to a preselected location.

13. The system of claim 9 wherein:

said remote control can cause the light source to increment a desired amount.

14. The positioner of claim 4 wherein:

said remote control can cause the laser beam to seek to a preselected location.

15. The positioner of claim 4 wherein:

said remote control can cause the laser beam to increment a desired amount.

16. The positioner of claim 1 wherein:

at least one of said first and second controllers is adapted to cause a laser beam of a laser projection system to seek to a preselected location.

17. The positioner of claim 1 wherein:

at least one of said first and second controllers is adapted to cause a laser beam of a laser position determining system to increment a desired amount.

18. A laser projection system comprising:

a base;

a laser capable of generating a laser beam movably mounted to said base;

a control mechanism that can be remotely controlled in order to position said laser relative to said base;

a remote controller that can send a control signal to said control mechanism in order to position said laser relative to said base;

said remote controller capable of at least one of (1) causing said laser beam to seek to a preselected location, (2) causing the location of said laser beam to be incremented a preselected amount, (3) causing the laser beam to move incrementally, and (4) causing the laser beam to move continuously, and said control mechanism can cause said laser to move along an axis and to rotate about said axis.

19. The system of claim 18 including:

a positioner onto which said laser can be mounted in order to cause the laser to be movable along a vertical line.

20. The system of claim 9 wherein:

said first and second controller are the same controller.

21. The positioner of claim 1 wherein:

said movement device includes a motor that can move the carriage relative to said base.

22. The positioner of claim 1 in combination with a laser projection system wherein:

said laser projection system can include any device that projects a source of light in any direction or combination of directions either discretely or continuously.

23. The positioner of claim 1 wherein:

said remote control can receive and store data sent from at least one of another control and another source.

24. The system of claim 1 including:

a range finding system.

25. The system of claim 2 including:

a range finding system that can determine the distance to a location; and a device that can determine a desired elevation at said desired location referenced from a first elevation at a first location and a desired inclination.

26. The system of claim 1 including:

a range finding system; and a device that can implement a desired inclination from a first location.

27. The system of claim 26 wherein:

the range finding system determines a first distance to a first elevation at a first location;

the range finding system determines a second distance to a desired location and calculates a new elevation based on a desired inclination from the first elevation.

* * * * *